US012765470B2

(12) United States Patent
Cherney

(10) Patent No.: US 12,765,470 B2
(45) Date of Patent: Oct. 20, 2026

(54) SPRING SHUTTLE RETURN NEEDLE PROTECTION

(71) Applicant: AGCO Corporation, Duluth, GA (US)

(72) Inventor: Patrick L. Cherney, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 19/449,380

(22) Filed: Jan. 14, 2026

(65) Prior Publication Data

US 2026/0215374 A1 Jul. 30, 2026

Related U.S. Application Data

(60) Provisional application No. 63/750,964, filed on Jan. 29, 2025.

(51) Int. Cl.
*A01F 15/14* (2006.01)

(52) U.S. Cl.
CPC .................................. *A01F 15/145* (2013.01)

(58) Field of Classification Search
CPC ..................................................... A01F 15/145
USPC ........................................................ 289/2, 16
See application file for complete search history.

(56) References Cited

U.S. PATENT DOCUMENTS

| | | | | |
|---|---|---|---|---|
| 2,824,184 | A * | 2/1958 | Mandleco | A01F 15/14 200/61.18 |
| 4,074,623 | A | 2/1978 | White | |
| 4,117,775 | A | 10/1978 | White et al. | |
| 4,196,661 | A * | 4/1980 | Yatcilla | A01F 15/148 200/61.18 |
| 5,782,175 | A * | 7/1998 | Schrag | A01F 15/0858 56/343 |
| 10,588,265 | B2 | 3/2020 | Chaney | |
| 2020/0146218 | A1 | 5/2020 | Maelfeyt et al. | |
| 2023/0031888 | A1* | 2/2023 | Cherney | A01F 15/145 |

FOREIGN PATENT DOCUMENTS

| | | | | |
|---|---|---|---|---|
| BE | 1023832 | B1 * | 8/2017 | A01F 15/145 |
| CN | 107018768 | A * | 8/2017 | A01F 15/146 |
| GB | 701178 | A | 12/1953 | |

OTHER PUBLICATIONS

Translation CN 107018768.*
Translation BE 1023832.*
UK Intellectual Property Office, Search Report for related UK Application No. GB2501692.4, dated Jul. 8, 2025, 4 pages.

* cited by examiner

*Primary Examiner* — Shaun R Hurley

(57) ABSTRACT

A knotter assembly has a needle assembly configured to interact with knotter mechanisms to form knots in binding material. The needle assembly includes a plurality of needles and a needle frame on which each of the plurality of needles is mounted. A shuttle moves the needle frame such that the needles are shiftable relative to the baling chamber during a tie cycle. A needle drive assembly moves the shuttle between a full-throw position in which the needles extend into the bale chamber to advance strands of binding material so that the knotter mechanisms can secure the binding material around the bale and a home position in which the needles moved out of the baling chamber to permit operation of the plunger. A biasing mechanism is attached to the shuttle to bias the shuttle into the home position.

7 Claims, 3 Drawing Sheets

SPRING SHUTTLE RETURN NEEDLE PROTECTION

CROSS-REFERENCE TO RELATED APPLICATIONS

This application claims the benefit of the filing date of U.S. Provisional Patent Application 63/750,964, "Spring Shuttle Return Needle Protection," filed Jan. 29, 2025, the entire disclosure of which is incorporated herein by reference.

BACKGROUND OF THE INVENTION

Field of Invention

This invention relates to relates to agricultural balers having a bale knotting assembly using twine to bind the bales and, more particularly, to a needle protection system for the needles of the knotting assembly.

Description of Related Art

Agricultural balers that gather, compress, and shape crop material into a bale are well known in the art. A baler that produces rectangular bales is often referred to as a square baler. Square balers usually utilize a compression system including a gearbox with a crank arm and connecting rod which is attached to a plunger. During each rotation of the crank arm, the plunger compresses the crop in a baling chamber as the plunger moves towards the rear of the baler. Typically, square balers are equipped with means to wrap twine around a formed bale and tie off the twine to secure the bale before the bale is ejected from the baler chamber. This includes a knotter assembly having a knotter disc rotated by a powered drive shaft that controls a rotational movement of the components of the knotter assembly. As part of the tying process, needles deliver twine through the baling chamber to the knotter assembly. Agricultural balers, utilizing knotter assemblies that form two knots on every loop for binding a bale have been available for many years. When a bale reaches its desired length, a knot tying cycle is initiated. During this tying cycle, two knots are formed, a first knot for closing the loop of the finished bale and a second knot for starting the loop for the next bale.

If the drive mechanism for the needles should fail during a tying cycle, and thus leave the needles within the baling chamber instead of retract them fully therefrom as intended, the plunger with the new, to be compressed charge, will hit the needles causing damage to the needles and possibly to other parts and elements of the baler. U.S. Pat. No. 4,117,775 in the name of Hesston Corporation describes a safety control linkage which will take over the withdrawal of the needles from the path of travel as the plunger continues in operation. The relationship between the linkage and the needles is such the linkage will come into play if the driving mechanism is failing and is unable to withdraw the tying needles in the normal manner.

However, the linkage is complicated and occupies much of the limited space available on the baler. It would be desirable to have a simpler needle protection system for the knotter assembly.

BRIEF SUMMARY

In one aspect the invention is directed to a knotter assembly for use with a baler, the knotter assembly configured for use with a baler and operable to produce knots in strands of binding material during a tie cycle to bind a bale of crop material compressed in a baling chamber 110 of the baler with a reciprocating plunger. The knotter assembly includes a plurality of knotter mechanisms provided crosswise of the bale chamber at spaced intervals. The knotter assembly also includes a needle assembly configured to interact with the plurality of knotter mechanism to form knots in binding material. The needle assembly includes a plurality of needles such that there is one needle for each one of the plurality of knotter mechanisms and a needle frame on which each of the plurality of needles is mounted. A shuttle moves the needle frame such that the needles are shiftable relative to the baling chamber during a tie cycle. A needle drive assembly moves the shuttle between a full-throw position in which the needles extend into the bale chamber to advance strands of binding material so that the knotter mechanisms can secure the binding material around the bale and a home position in which the needles moved out of the baling chamber to permit operation of the plunger. A biasing mechanism is attached to the shuttle to bias the shuttle into the home position.

These and other features and advantages of this invention are described in, or are apparent from, the following detailed description of various exemplary embodiments of the systems and methods according to this invention.

BRIEF DESCRIPTION OF THE SEVERAL VIEWS OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

Figure 1:
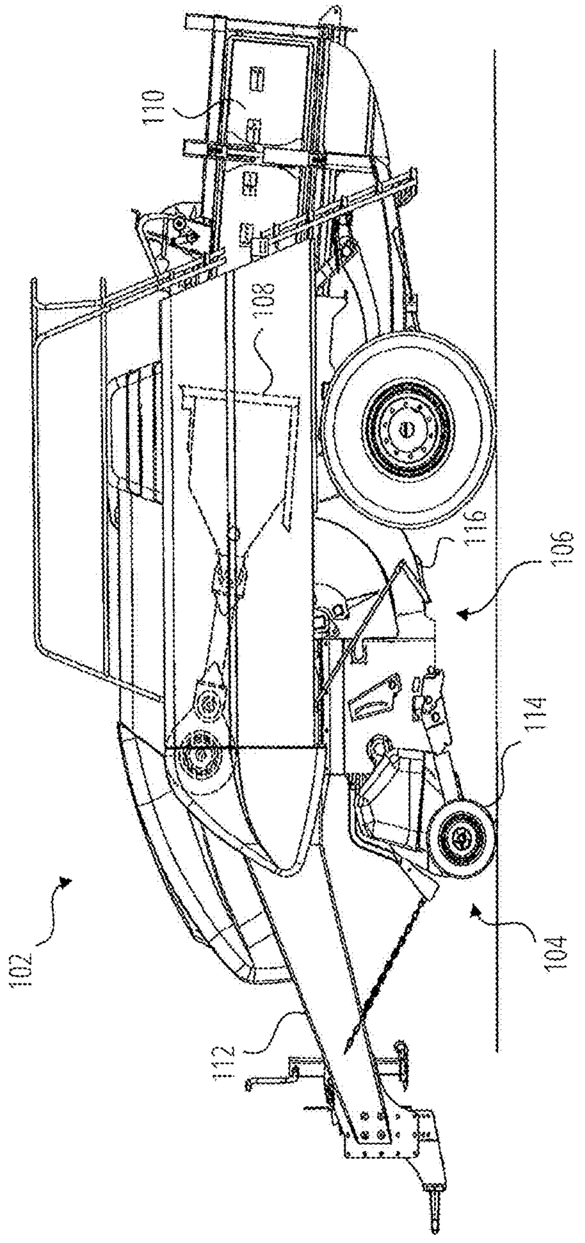
FIG. 1 is a side elevation view of an example baler machine configured to receive loose plant material and shape and secure the material into a bale.

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description. Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel.

Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail. In the description which follows and in certain passages already set forth, the principles of the present invention will be described in terms of "twine" and "knots" formed in such twine. While twine is used in the exemplary embodiment, the term binding material is intended to mean not only twine made from natural or synthetic fibers, but may also include metallic wire or other strapping material.

As used herein, the singular forms following "a," "an," and "the" are intended to include the plural forms as well, unless the context clearly indicates otherwise. As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded. As used herein, the term "configured" refers to a size, shape, material composition, and arrangement of one or more of at least one structure and at least one apparatus facilitating operation of one or more of the structure and the apparatus in a predetermined way.

As used herein, any relational term, such as "first," "second," "top," "bottom," "upper," "lower," "above," "beneath," "side," etc., is used for clarity and convenience in understanding the disclosure and accompanying drawings, and does not connote or depend on any specific preference or order, except where the context clearly indicates otherwise.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.). As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

Referring to FIG. 1, an example agricultural baler 102 is shown into which embodiments of the present invention may be incorporated. Although the example baler 102 is a towed square baler, it will be appreciated that embodiments of the present invention may be incorporated into other types of balers (e.g., self-propelled) with few or no changes. Broadly, the baler 102 may be configured to move over a field and collect previously cut plant material and to compress, shape, and secure the collected plant material into a plurality of bales. The baler 102 may generally include a pickup assembly 104, a stuffer chute assembly 106, a reciprocating plunger 108, and a baling (or compression) chamber 110. Additionally, the baler 102 may be hitched to a towing vehicle (not shown) by a tongue 112, and power for operating the various mechanisms (e.g., the reciprocating plunger 108) of the baler 102 may be supplied by a power take-off of the towing vehicle. The pickup assembly 104 may be configured to collect the cut plant material from the field. In one implementation, the baler 102 may include a pair of ground wheels 114 that support the pickup assembly 104 as the baler 102 moves over the field. The stuffer chute assembly 106 may be configured to direct the collected plant material into position to be moved into the baling chamber 110. In one implementation, the stuffer chute assembly 106 may include a charge-forming duct 116 extending from an inlet opening adjacent to the pickup assembly 104 to an outlet opening into the baling chamber 110. The crop material is moved from charge-forming duct 116 into the baling chamber 110 where the reciprocating plunger 108 may be configured to compress the plant into a growing bale. In one implementation, the plunger 108 may be configured to reciprocate within the baling chamber 110 in repeating compression and retraction strokes across the outlet opening of the charge-forming duct 116. As the plunger 108 retracts, the outlet opening is uncovered and an additional flake, charge, or other subunit of plant material enters the baling chamber 110, and as the plunger 108 contracts the outlet opening is covered and the additional subunit of plant material is compressed into the growing bale.

Completed bales are tied with binding material, for example twine. The reciprocating plunger 108 presses newly introduced charges of crop material against a previously formed and tied bale to form a new bale. This action also causes both bales to intermittently advance toward a rear discharge orifice of the 102 where the bales are discharged from the rear end of the bale-forming chamber. Each strand of twine is looped around the formed bale and bound with knots in a known manner as will briefly be described.

Figure 2:
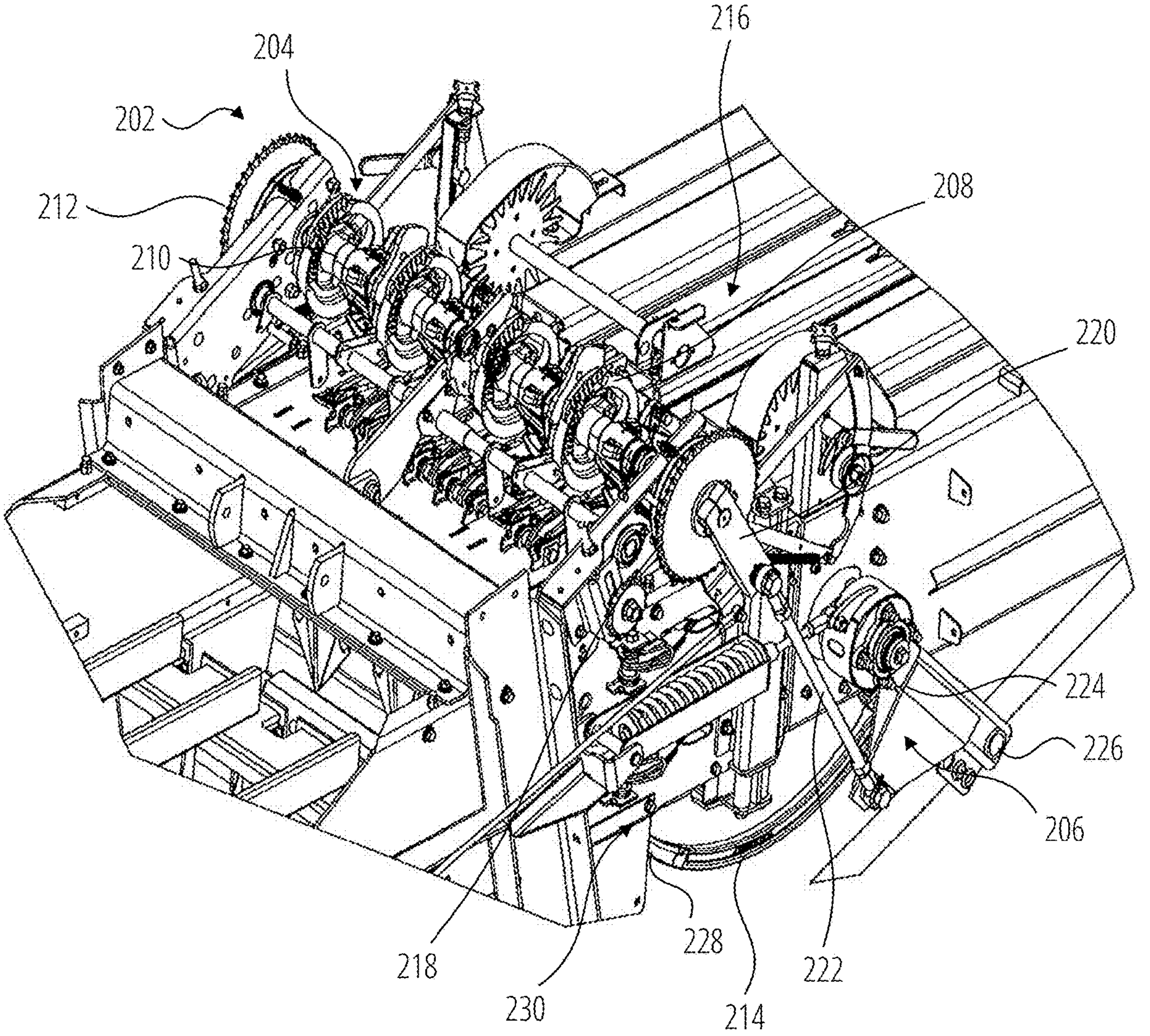
FIG. 2 is a perspective view of a portion of a baling chamber and knotter assembly of the baler of FIG. 1.

Turning now to FIG. 2, when the bales reaches a predetermined size (such as determined by an appropriate bale length sensor (not shown)), a trigger engages a suitable clutch understood by one skilled in the art which in turn is connected to a knotter assembly 202. As will be appreciated, the knotter assembly 202 comprises a set of individual knotter mechanisms 204 provided crosswise of the bale chamber 110 at spaced intervals and a needle assembly 206. Each knotter mechanism 204 has a knotter disc 208 with various gear stretches. Strands of binding material such as twine, are drawn from supply rolls provided in a twine box located on the baler 102 through a plurality of twine guides and provided to each knotter mechanism 204.

In the usual manner, each knotter disc 208 is configured to be driven by a drive shaft 210 and a drive sprocket 212. The knotter discs 208 are powered by the drive shaft 210 and cooperate with needles 214 of the needle assembly 206 to form at least one knot in respective strands of twine during a bale tie cycle. Each knotter mechanism 204 has an associated needle 214 for assisting in forming an individual loop around the formed bale. The knotter assembly 202 may be similar in many respects to the knotter assembly shown in U.S. Pat. No. 4,074,623. As knotter mechanisms 204 are well known in the art, further discussion of knotter mechanisms is not necessary.

The illustrated needle assembly 206 includes a needle drive assembly 216 including a driven needle sprocket 218, a crank arm 220, and a rod 222 configured to operate a needle shuttle 224. In the illustrated embodiment, the rod 222 connects with a plate 318 attached to the shuttle 224. The shuttle 224 operates a needle frame 226 carrying the plurality of needles 214. The needle sprocket 218 and the crank arm 220 are attached to and rotate with the drive shaft 210 of the knotter assembly 202. In particular, the needle sprocket 218 and crank arm 220 are each configured to rotate a single revolution with the drive shaft 210 during a bale tie cycle. The bale tie cycle is initiated when a clutch (not shown) is engaged. The needles 214 are mounted on the needle frame 226 and are each associated with a respective strand of twine. The needle 214 presents a distal needle end 228 that receives and supports the twine during operation and is configured to advance the twine vertically along an end of the bale.

Figure 3:
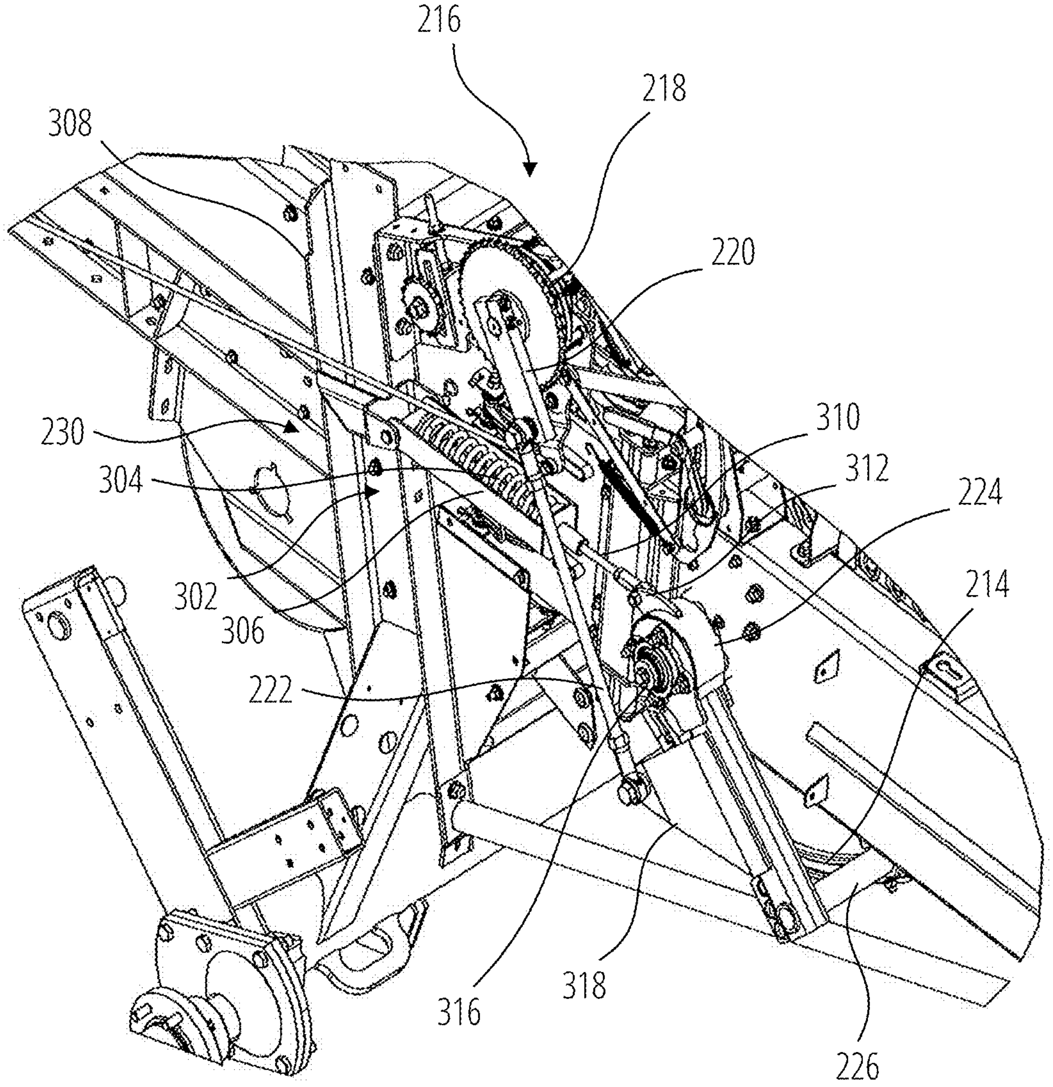
FIG. 3 is a perspective view of a portion of a baling chamber and knotter assembly of the baler of FIG. 1.

Turning also now to FIG. 3, the needles 214 are shiftable relative to the baling chamber 110 during a tie cycle. As the needle sprocket 218 rotates, the crank arm 220 causes the shuttle 224 to rotate about a pivot 316 and move from a "home" or rest position in which the needles 214 are fully below the bale chamber 110 and a "full-throw" position in which the needles 214 extend across the bale chamber 110. Thus, the needles 214 are shiftable upwardly into the baling chamber 110 during the bale tie cycle to advance strands of twine upwardly along an end of the bale. The needles 214 position the strands of twine so that the knotter mechanisms 204 can secure the twine around the bale. The needles 214 are shiftable downwardly out of the baling chamber 110 back to the home position during the return stroke of the bale tie cycle to permit operation of the plunger and formation of the next bale. Although the illustrated embodiment references upward and downward directions associated with the needles 214 and other baler components, it will be appreciated that at least some aspects the present invention broadly cover alternative orientations and movements of the baler components. For instance, it is within the scope of at least some aspects of the present invention for the needle assembly to be alternatively positioned relative to the baling chamber (e.g., above the chamber).

According to the invention, a biasing mechanism 230 is attached to the shuttle 224 to bias the shuttle 224 into the home position. In the illustrated embodiment, the biasing mechanism 230 includes a spring assembly 302 having compression spring 304 mounted in a housing 306. The housing 306 is secured to the baler frame 308. One end of the compression spring 304 is secured in the housing 306 and the other end is connected to a shuttle rod 310 that attaches to a fin 312 on the shuttle 224. As the shuttle 224 is driven during the tie cycle to the full-throw position, the spring 304 is compressed. As the shuttle 224 returns back to the home position at the end of the tie cycle, the spring 304 relaxes. If for some reason during the tie cycle there is a failure in needle drive assembly 216, the biasing mechanism 230 attempts to return the shuttle 224, and thus the needles 214 back to the home position. Desirably, the biasing mechanism 230 provides positive protection throughout the entire tie cycle and requires no timing of the baler 102. If at any point during the tie cycle the needle drive assembly 216 fails, the biasing mechanism 230 provides needle protection as it will pull the needles 214 to the home position, preventing the needles 214 from being damaged by the next plunger 108 stroke.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. A knotter assembly for use with a baler, operable to produce knots in strands of binding material during a tie cycle to bind a bale of crop material compressed in a baling chamber of the baler with a reciprocating plunger, the knotter assembly comprising:

- a plurality of knotter mechanisms provided crosswise of the baling chamber at spaced intervals;
- a needle assembly configured to interact with the plurality of knotter mechanisms to form knots in binding material, the needle assembly comprising:
  - a plurality of needles such that there is one needle for each one of the plurality of knotter mechanisms;
  - a needle frame on which each of the needles are mounted;
  - a shuttle configured to move the needle frame such that the needles are shiftable relative to the baling chamber during a tie cycle;
  - a needle drive assembly that moves the shuttle between a full-throw position in which the needles extend into the baling chamber to advance strands of binding material so that the knotter mechanisms can secure the binding material around the bale and a home position in which the needles are moved out of the baling chamber to permit operation of the plunger; and
  - a biasing mechanism attached to the shuttle to bias the shuttle into the home position.

2. The knotter assembly of claim 1 wherein the biasing mechanism includes a spring assembly having a compression spring mounted in a housing.

3. The knotter assembly of claim 2 wherein when the shuttle is driven during the tie cycle to the full-throw position, the spring is compressed and as the shuttle returns back to the home position at the end of the tie cycle, the spring relaxes such that if there is a failure in the needle drive assembly, the biasing mechanism returns the shuttle to the home position which moves the needles out of the baling chamber.

4. The knotter assembly of claim 1 wherein the needle drive assembly comprises a driven needle sprocket, a crank arm, and a rod configured to move the needle shuttle.

5. The knotter assembly of claim 4 wherein the driven needle sprocket is attached to and rotates with a drive shaft of the knotter assembly.

6. The knotter assembly of claim 1 wherein the shuttle moves about a pivot.

7. A baler comprising the knotter assembly of claim 1.

* * * * *